United States Patent [19]

Shuert

[11] Patent Number: 4,765,252

[45] Date of Patent: * Aug. 23, 1988

[54] CONTAINER WITH SLEEVE INTERLOCKING LATCH

[76] Inventor: Lyle H. Shuert, 817 N. Fieldstone, Rochester, Mich. 48063

[*] Notice: The portion of the term of this patent subsequent to Nov. 5, 2002 has been disclaimed.

[21] Appl. No.: 80,230

[22] Filed: Jul. 28, 1987

Related U.S. Application Data

[63] Continuation of Ser. No. 858,524, Apr. 23, 1986, abandoned, which is a continuation of Ser. No. 642,778, Aug. 21, 1984, abandoned.

[51] Int. Cl.⁴ ............................................. B65D 19/18
[52] U.S. Cl. .................................. 108/55.1; 206/600; 220/4 F; 108/901; 108/56.1

[56] References Cited

U.S. PATENT DOCUMENTS

| | | | |
|---|---|---|---|
| 2,893,588 | 7/1959 | Martin | 108/55.1 |
| 3,173,716 | 3/1965 | Silvers | 292/147 |
| 3,478,914 | 11/1969 | Williams | 220/4 F |
| 3,502,237 | 3/1970 | Vevhein et al. | 220/4 F |
| 3,598,273 | 8/1971 | Rau et al. | 220/4 F |
| 3,664,570 | 5/1972 | Kupersmit | 108/55.1 |
| 3,709,160 | 1/1973 | Howard et al. | 108/901 |
| 3,797,691 | 3/1974 | Williams, Jr. | 206/600 |
| 3,828,964 | 8/1974 | Bonnot | 206/600 |
| 3,986,659 | 10/1976 | Vajtay | 220/4 R |
| 4,254,873 | 3/1981 | Cook, III et al. | 206/599 |
| 4,445,614 | 5/1984 | Mitsumori et al. | 108/56.1 |

FOREIGN PATENT DOCUMENTS

| | | | |
|---|---|---|---|
| 251639 | 6/1927 | Italy | 217/43 A |
| 2038278 | 7/1980 | United Kingdom | 206/600 |
| 2093430 | 9/1982 | United Kingdom | 108/51.1 |

Primary Examiner—Peter A. Aschenbrenner
Attorney, Agent, or Firm—Krass and Young

[57] ABSTRACT

A reusable plastic base serves as a pallet which may be lifted by the forks of a forklift truck. A sleeve is removably attached to the base and forms the sidewalls of the container. In the preferred embodiment, the sleeve is made of corrugated material having slots formed along its lower edge. The slots are adapted to coact with latch members slidably mounted in the base to releasably secure the pallet to the sleeve. The base is preferably designed with a peripheral groove lying substantially at floor level to receive the edge of the sleeve. Compressive loads applied to the container are transferred to the sleeve directly to the floor, thereby minimizing deformation of peripheral portions of the base.

13 Claims, 3 Drawing Sheets

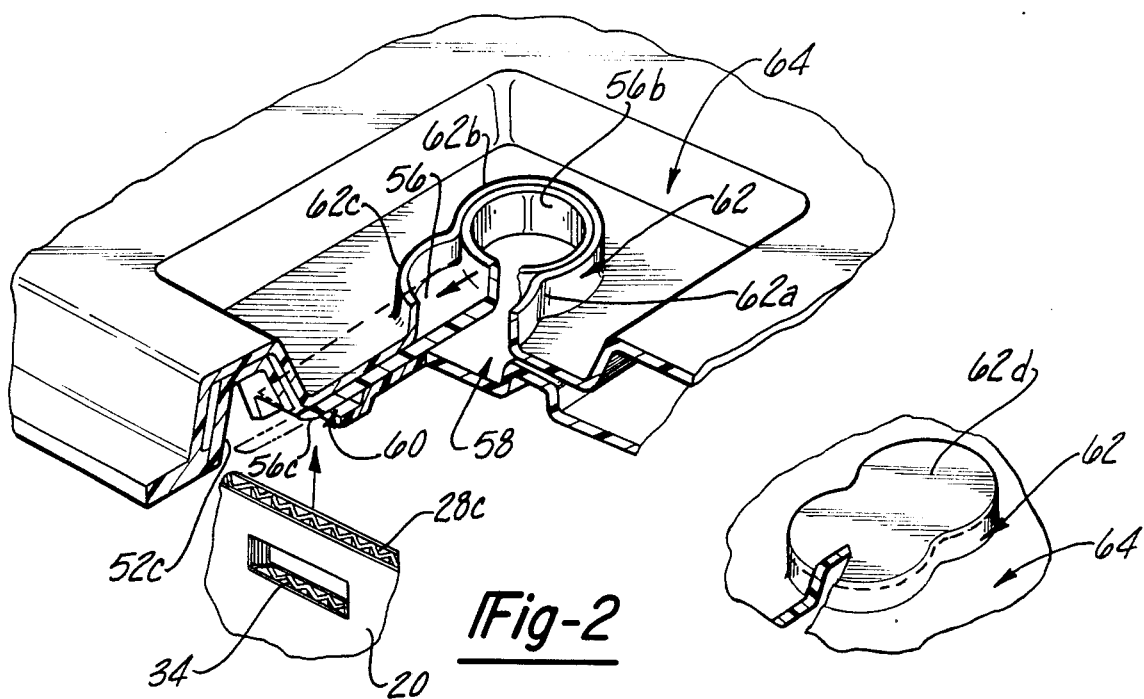
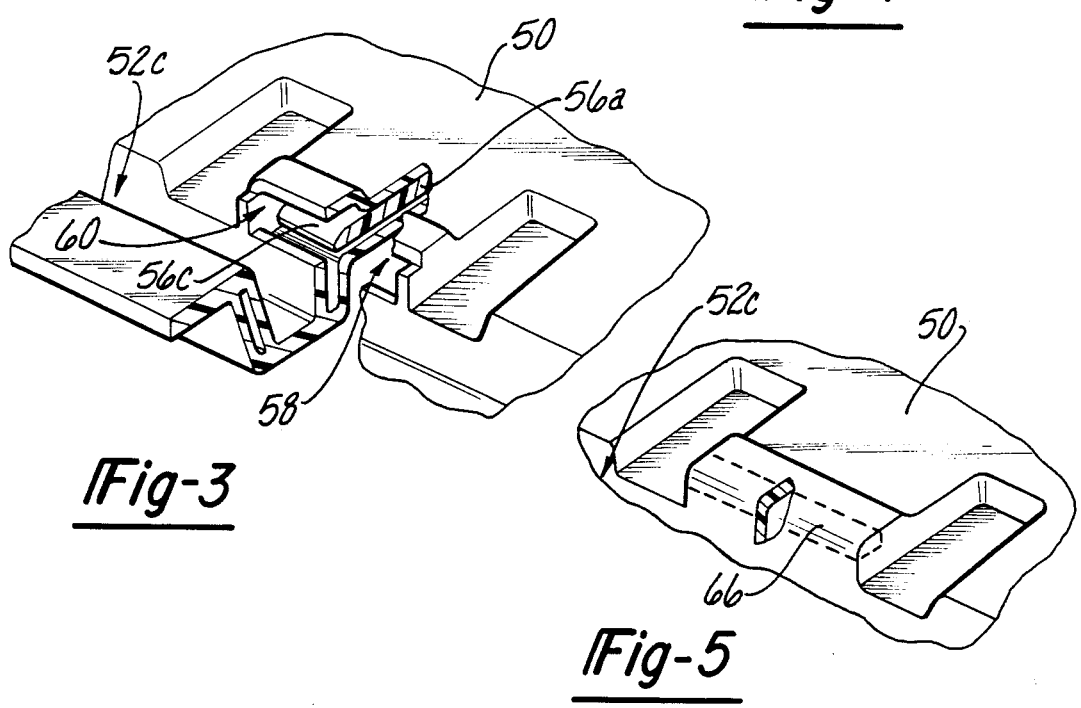

CONTAINER WITH SLEEVE INTERLOCKING LATCH

This is a continuation of co-pending application Ser. No. 858,524 filed on Apr. 23, 1986, now abandoned, which is a continuation of co-pending application Ser. No. 642,778 filed on Aug. 21, 1984, now abandoned.

BACKGROUND OF THE INVENTION

This invention relates to shipping and storage containers. More particularly, it relates to containers in which the base of the container serves as a reusable pallet.

Various container designs have been employed to ship and store industrial goods. In many instances the containers are stored in large warehouse facilities where they are moved from one location to another by forklift trucks or the like. One commonly used container incorporates a corrugated sleeve which is nailed to a conventional wooden pallet. The sleeve forms the side walls of the container and the pallet serves as its bottom. The use of the wooden pallets, however, has some drawbacks. For example, they are subject to breakage and thus are not reusable over an extended period of time. Wooden pallets also take up a considerable amount of valuable floor space in the warehouse when they are not in use.

In an effort to solve some of the problems with the wooden pallets, reusable plastic pallets have been employed with some degree of success. Such pallets have been combined with corrugated sides and a plastic cover to form a container. The plastic pallet and cover are reusable and may be more compactly stacked when not in use, thereby providing significant advantages over the use of conventional wooden pallets. U.S. Pat. No. 4,254,873 to Cook III et. al. is a representative example of such a composite container design.

These composite container designs also have their drawbacks. The edges of the sleeve merely rest in grooves in the pallet and cover in most of the known designs. Consequently, some additional means must be provided to hold them together prior to shipping. Generally the pallet, corrugated sleeve, and cover are banded together by steel bands or cords encircling the three components. This banding process introduces an additional expense in both time and money since the container must not only be bound prior to shipping but it also must be unbound before the containers contents can be removed.

As previously noted, warehouse space is valuable. It is therefore desirable to be able to stack these composite containers on top of one another in order to conserve space. In such instances the lower containers often experience substantial compressive forces from the weight of the upper containers. These compressive forces are generally transferred by the sides of the container downwardly to the peripheral edges of the pallet. In the typical prior art designs, legs or spacers providing clearance for the skids of the forklift are spaced inwardly of the peripheral edges of the pallet. The compressive loads applied through the sides of the container are often sufficient to deform the peripheral portions of the pallet outside of the supporting legs or spacers. Such deformation may damage the pallet to such an extent that it is not readily reusable.

The structural rigidity of these pallets may be enhanced by using more plastic material or by using special reinforcing means but such measures unduly increase manufacturing costs.

The present invention is directed to solving one or more of these problems.

SUMMARY OF THE INVENTION

There are several inventive features disclosed in this patent which may be used alone or in combination. One feature is the provision of a container employing a base and a removable sleeve providing side walls for the container. The sleeve includes a plurality of slots formed at peripherally spaced locations along its lower edge portion. These slots are aligned with latches slidably mounted in peripherally spaced portions of the base. The latches are adapted to pass through the slots to securely hold the sleeve on the base. In the preferred embodiment, the base is made of plastic and the sleeve is made of corrugated material. The base is also formed with indentations which serve to receive the skids of a forklift or the like so that the base may function as a pallet and the latches are mounted in the base in the vicinity of the skid indentations.

A cover may optionally be provided for the container. The cover is preferably identical to the base and is removably attached to the sleeve in an identical manner.

Another feature of the invention is that the base includes means lying in substantially the same plane as the bottom surface of the base for receiving the lower edges of the sleeve. The skid receiving indentations in the base are located inboard and above at least the corner edges of the sleeve. Accordingly, downward compressive forces applied to the container are transferred by the sleeve substantially directly to the supporting surface, thereby minimizing deformation of the peripheral portions of the base.

BRIEF DESCRIPTION OF THE DRAWINGS

Various other advantages of the present invention will become apparent to one skilled in the art upon reading the following specification and by reference to the drawings in which:

FIGS. 2–8 are fragmentary perspective detail views showing various aspects of the construction and operation of the latch and slot locking arrangement of the invention.

DETAILED DESCRIPTION OF THE PREFERRED EMBODIMENT

Figure 1:
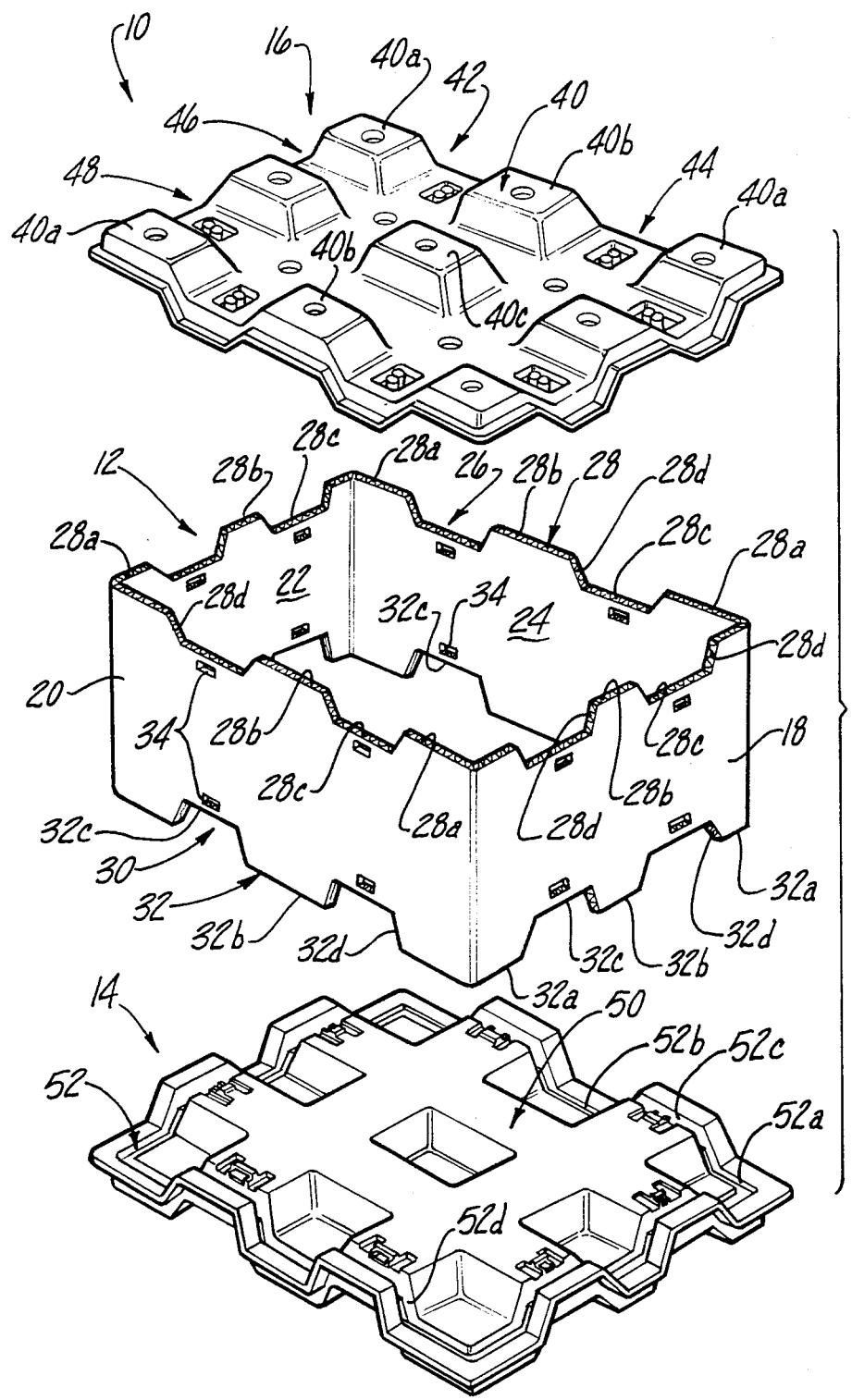
FIG. 1 is an exploded perspective view of a container made in accordance with the preferred embodiment of the invention.
Figure 6:
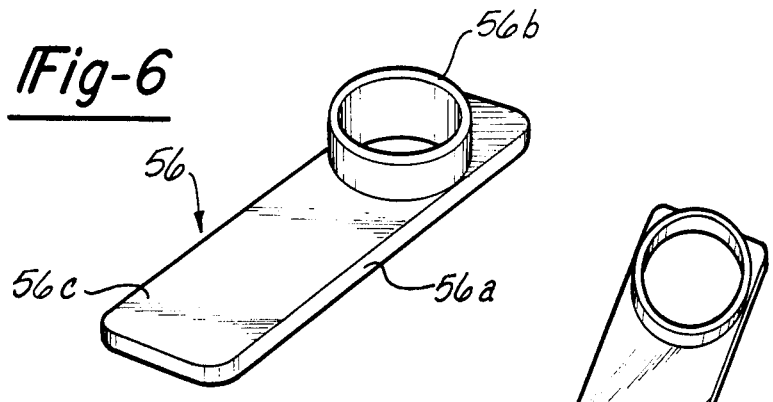

FIG. 1 illustrates a container 10 made in accordance with the preferred embodiment of the present invention. Container 10 is of composite design employing a sleeve 12 removably attached to a lower end unit or base 14 and an upper end unit or cover 16. Sleeve 12 takes the form of an open-ended rectangular box providing side walls 18, 20, 22 and 24 for the container 10. In this embodiment, sleeve 12 is formed of three ply panels of corrugated material such as is commercially available from Tri-Wall Containers, Inc. Corrugated material for sleeve 12 is preferred because it is relatively inexpensive, is easy to form, and can be collapsed when not in use. At the same time, the preferred corrugated sleeve exhibits comparatively good strength characteristics. However, it should be understood that various other suitable materials may be used for sleeve 12.

A plurality of inverted truncated pyramidal cutouts 26 are define in the top edge 28 of the sleeve so that top edge 28 is constituted by corner portions 28a, intermediate portions 28b, inset portions 28c, and angled portions 28d. Similarly, a plurality of truncated pyramidal cutouts 30 are defined in the bottom edge 32 of the sleeve so that bottom edge 32 is constituted by corner portions 32a, intermediate portions 32b, inset portions 32c, and angled portions 32d. A through slot 34 is provided immediately below and centrally of each top edge inset portion 28c and immediately above and centrally of each bottom edge insert portion 32c.

In the preferred embodiment, end units 14 and 16 are identical. In use, the cover end unit 16 is flipped over 180° with respect to the base end unit 14. The base and cover units are preferably made of plastic and thus the same mold may be used to make both units. In this embodiment, the base and cover are made by vacuum forming sheets of organic polymeric material such as polyethylene. They are both made of a twin sheet construction employing two skins which are fused or knitted together at various points to aid in structural rigidity. However, it should be noted that various plastic materials and other formation techniques such as injection molding, rotocasting and the like may be alternately employed.

Since the base 14 and the cover 16 end units are identical, the same reference numerals will be used to refer to common elements. Each end unit is generally planar and includes a flat outer face 40 configured so that at least the corner sections thereof may lie on the supporting surface such as the floor for the container. A plurality of elongated tunnels or indentations 42, 44, 46, 48 displaced from the plane of face 40, extend transversely and longitudinally across face 40 to divide face 40 into a plurality of spaced sections including corner sections 40a, intermediate sections 40b, and a central section 40c. Indentations 42, 44, 46, 48 provide relieved access areas for receiving the forks of a forklift truck or the like. As a consequence, the end unit may serve as a pallet for the container 10 which may thus be lifted and moved by conventional warehousing equipment. Indentations 42–48 also provide a cross hatch configuration for the inner face 50 of the end unit.

The periphery of inner face 50 is provided with a continuous circumferential groove 52 for receiving the related edge of sleeve 12. Groove 52 has end portions 52a opposite outer face end sections 40a; intermediate portions 52b opposite outer face intermediate sections 40b; inset portions 52c opposite outer face tunnels 42, 44, 46, 48 and angled portions 52d interconnecting portions 52a–52c and 52b–52c. Portions 52a, 52b and 52c have a size, configuration, and contour matching that of sleeve edge portions 32a–32d so that when an edge portion of the sleeve 12 is fitted into a groove 52 the surfaces of the groove and the adjacent surfaces of the edge portion of the sleeve provide a snug, contiguous fit around the entire interfitting circumference of the sleeve and end unit. In particular, with the sleeve and end units thus interfitted, inset edge portions 32c are disposed in inset groove portions 52c with slots 34 totally captured in the groove, and edge portions 32a and intermediate portions 32b are positioned substantially in the plane of end unit outer surface 40 so that, in the case of an end unit constituting a ground supported pallet for the container, the bottom edge of the sleeve terminates substantially at ground level. Thus, compressive forces applied downwardly to the container 10 are transferred by the sleeve 12 substantially directly to the floor or other supporting surface. As a result, deformation problems associated with the prior art designs are effectively eliminated without a substantial increase in manufacturing costs.

A plurality of latch assemblies are provided on each end unit 14,16 at circumferentially spaced locations thereabout. The latch assemblies correspond in number and circumferential position to the slots 34 in sleeve 12.

Each latch assembly includes a latch member 56 mounted in the end unit for detented, sliding movement between a retracted position in which the related sleeve edge is free to enter or leave groove portion 52c and an extended or locking position in which the tip of the latch member is lockingly engaged in a related sleeve slot 34 to lockably but releasably secure the sleeve to the end unit.

Latch members 56 are preferably formed of the same plastic material as the end units and each includes a main body portion 56a, in the form of an elongated plate, and a annular handle or actuator portion 56b formed integrally with main body portion 56a adjacent one end thereof. Latch members 56 are slidably positioned between the inner and outer skins of the end unit. Specifically, the inner and outer skins are configured to define slideways 58 extending perpendicularly inwardly from groove portions 52c and opening at their outboard ends 60 in those groove portions. Latch members 56 are positioned in slideways 58 with latch handle portions 56b received in detent structures 62 formed integrally with the outer skin of the end unit and disposed in depressions 64 formed in the outer skin at the outboards ends of tunnels 42–48.

Detent structures 62 have a generally figure eight formation with the neck 62a at the juncture of the two halves of the detent dimensioned to be slightly smaller than the external diameter of latch handle portion 56b so that handle portion 56b passes snappingly between detent halves 62b and 62c as the latch moves between its retracted and extended positions in response to a pull or push exerted by a finger or fingers inserted into the open end of handle portion 56b.

Figure 7:
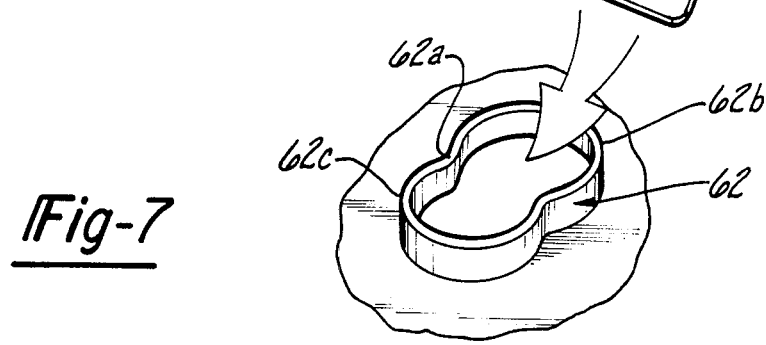
Figure 8:
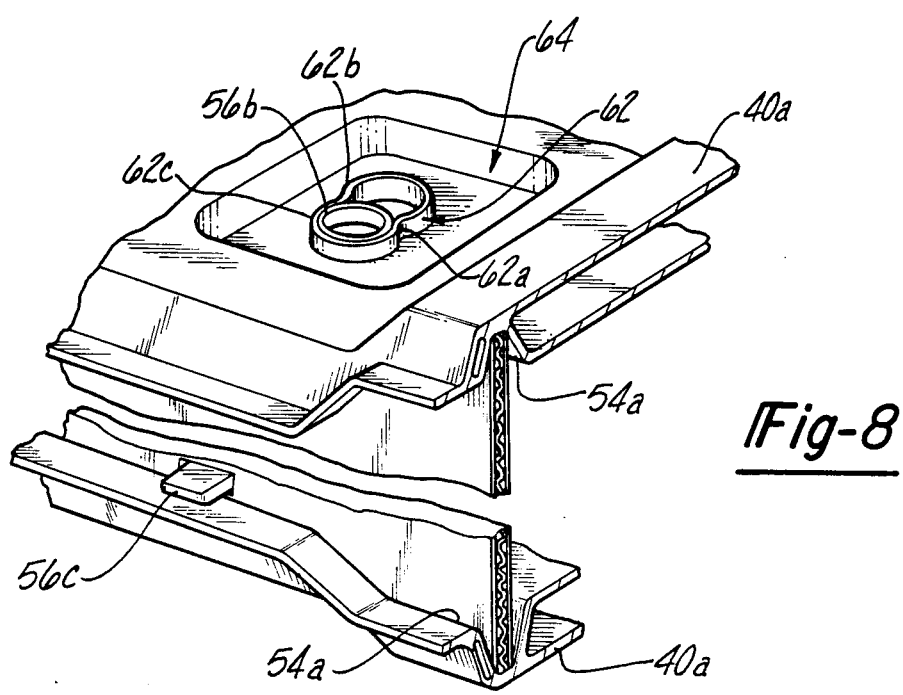

End units 14 and 16 are preferably formed in a twin sheet press in which the two skins of the unit are individually formed and then fused or knitted together to form the double wall structure. The unit leaving the press includes cover material 62d (FIG. 4) over detent 62, which is suitably punched out, and material 66 (FIG. 5) covering slideway opening 60, which is suitably cut away. Latch members 56 are then mounted in slideways 58 by inserting them tip end first (FIG. 7) into detents 62.

The invention container may be readily assembled by positioning the lower edge 32 of a sleeve 12 in the circumferential groove 52 of a base end unit 14, positioning a cover end unit 16 over the sleeve with the sleeve upper edge 28 positioned in the circumferential groove 52 of the cover end unit, and reaching into the tunnels or indentations 42–48 on both end units to grasp latch handle portions 56b and move the latches snappingly outwardly to their extended positions in which the tips 56c of the latches enter and lockingly engage with sleeve slots 34 to positively lock the sleeve to the end unit. Since handle portions 56b are positioned in indentations 42, 44, 46, 48, the latches are readily accessible irrespective of the location or stacking disposition of the related container. Disassembly of the container is of course readily achieved by a reverse procedure in which the latches, which as noted are always readily accessible, are moved snappingly to their retracted positions to allow separation of the sleeve and end units.

Those skilled in the art will appreciate that the design of the present invention offers significant advantages over previous composite container designs. Among the advantages is the elimination of the requirement of banding the components together. By contrast, the container of the present invention may be assembled or disassembled quite easily without necessitating external apparatus. The containers when assembled are stackable on top of one another due to their durable design. It may be advantageous to employ some sort of interlocking structure on the bottom of the base and top of the cover to prevent lateral slippage of the stacked containers. However, this is well within the skill of the ordinary practioner. By bringing the sleeve substantially to the floor level, or to the level of the upper surface of an underlying container, the container can withstand substantial compressive loads without having to use substantial amounts of plastic or additional reinforcing means when forming the base to counteract such loads. When the container is disassembled the base and cover may be easily stacked and nested within one another in a compact manner ready for use. The sleeve, likewise, may be collapsed and neatly stored when not in use. The disclosed latch and slot arrangement allows the containers to be repeatedly assembled without significant damage to the sleeve. On the other hand, the relatively inexpensive corrugated sleeve material may be thrown away as desired after a period of use. Still other advantages and modifications of the preferred embodiment of the invention will become apparent to those skilled in the art upon a sudy of the specification, drawings and claims.

I claim:
1. A container comprising:
    (A) a generally planar, horizontally extending base member having downwardly opening tunnels extending across the lower face thereof for receipt of the forks of a forklift truck;
    (B) means defining upwardly facing seat portions around the periphery of said base member over said tunnels;
    (C) a sleeve member adapted to be positioned on said base member with circumferentially spaced portions of its lower peripheral edge respectively seated over said tunnels on said seat portions;
    (D) a slot in at least certain of said lower peripheral edge portions of said sleeve member; and
    (E) a plurality of latch members mounted on said base member at circumferentially spaced locations around said base member over said tunnels and adjacent said seat portions for sliding movement along a generally horizontal line of action between a latching position in which said latch members extend across a vertical projection of said seat portions and respectively pass through the slots in the lower peripheral edge portions of said sleeve for releasably securing said sleeve to said base member and a released position in which said latch members are slidably withdrawn from said vertical seat portions projection and disengaged from said slots in said lower peripheral edge portions of said sleeve to allow said sleeve to be removed from said base member.
2. A container according to claim 1 wherein:
    (F) the tips of said latch members are inboard of said seat portions in the released position of the latch members and said tips of said latch members are extended outwardly across said seat portions and pass through said slots in said lower edge portions of said sleeve in the latching position of said latch members; and
    (G) an access opening is provided in said base member over said tunnels beneath each of said latch members to allow operator access to said latch members through said tunnels for movement of the latch members between their latching and release positions.
3. A container according to claim 2 wherein:
    (H) each of said latch members includes a handle portion extending downwardly through the respective access opening for access by the operator.
4. A container comprising:
    (A) a generally planar, horizontally extending base member;
    (B) means defining an upwardly opening U-shaped groove extending around the periphery of said base member and including a peripherally outer upwardly extending surface portion;
    (C) a sleeve member adapted to be positioned on said base member with its lower peripheral edge seated in said U-shaped groove;
    (D) a plurality of latch members mounted on said base member at circumferentially spaced locations around said base member adjacent said groove for sliding movement along a generally horizontal line of action intersecting the peripherally outer upwardly extending surface portion of said U-shaped groove between a latching position in which said latch members extend across the vertical projection of said groove and respectively engage the lower peripheral edge portion of said sleeve at circumferentially spaced locations therearound for releasably securing said sleeve to said base member and a released position in which said latch members are slidably withdrawn from said vertical groove projection and disengaged from said peripheral edge portion of said sleeve to allow said sleeve to be removed from said base member;
    (E) a plurality of slots being provided in the lower peripheral edge portion of said sleeve and said latch members being slidably mounted in said base member for reciprocal movement between said released position in which the tips of the latch members are inboard of said groove, whereby to allow the lower edge of said sleeve to be positioned in said groove, and said latching position in which the tips of the latch members are extended outwardly across said groove and pass through said slots in the lower edge portions of said sleeve to releasably secure the sleeve to said base member;
    (F) the undersurface of said base member being selectively raised in the vicinity of said latch members above the level of the general undersurface of said base to provide indentations for entry of the forks of a forklift truck or the like and to allow operator access to said latch members; and
    (G) said groove generally following the contour of said undersurface and, specifically, extending upwardly over said indentations and extending around the remainder of the periphery of said base member generally in the plane of said general undersurface.

5. A container according to claim 4 wherein:

H. the lower edge of said sleeve is selectively cut away to generally match the contour of said groove so that said sleeve may supportingly rest in said groove around its entire lower periphery.

6. A container comprising:

(A) a gnerally planar rectangular base member having (1) an undersurface defining downwardly facing support faces for the base member as the corners of the base member adapted to rest on an underlying supporting surface and selectively raised above the level of said support faces intermediate the corners of the base member to define tunnels for entry of lift truck forks or the like, and (2) an upper surface defining an upwardly facing rectangular seat extending continuously and completely around the periphery of said base member, including the corners of said base member, generally in the plane of said support faces; and (B) a sleeve having a selectively cut away lower peripheral edge generally conforming, three dimensionally, to said seat so that said lower peripheral edge may be seated on said seat with the cut outs therein spanning said tunnels and the remainder of the peripheral edge lying generally in the plane of said support faces to transfer downward compressive loads applied to the container substantially directly to the supporting surface on which said support faces are positioned.

7. A container according to claim 6 wherein said container further includes:

C. coacting releasable attachment means defined on said sleeve and on said base member in the vicinity of said tunnels.

8. A container according to claim 7 wherein:

D. said coacting releasable attachment means comprises coacting latch means including (1) a plurality of slots in the lower edge portion of said sleeve over the cutouts therein, and (2) a plurality of latch members slidably mounted in said base member over said tunnels for reciprocal movement between retracted positions in which the outboard tips of the latch members are inboard of said seat, whereby to allow the lower edge of said sleeve to be positioned on said seat, and an extended locking position in which the outboard tips of the latch members are extended across said seat and respectively pass through said slots in said sleeve to releasably secure said sleeve to said base.

9. A container comprising:

(A) a rectangular pallet having (1) a lower face including corner portions defining a downwardly facing lower support face adapted to be positioned on a suitable upwardly facing underlying support surface to support the container and second portions raised above the level of said corner portions to define tunnels extending beneath said pallet for receipt of the forks of a forklift truck, and (2) an upper face defining seat means positioned over the peripheral edges of said corner portions and lying substantially in the same plane as said downwardly facing lower support face defined by said corner portions;

(B) a sleeve having a lower edge including corner portions adapted to seat on said seat means so that said sleeve is supported by said pallet substantially in the plane of said support face and second portions raised above the level of said lower edge corner portions and adapted to seat on said second portions of said pallet over said tunnels;

(C) a slot in at least certain of said sleeve lower edge second portions and;

(D) latch members positioned on said second portions of said pallet over said tunnels for respective coaction with said slots and mounted for sliding movement between a latching position in which they pass through the respective slot to releasably secure said sleeve to said pallet and a released position in which they are withdrawn from said slots to allow said sleeve to be removed from said pallet.

10. For use in combination with a container sleeve having at least one wall with slots formed near the opposite edges to receive sliding latch members from a molded plastic pallet which forms an end closure for said sleeve;

a molded plastic pallet having top and bottom surfaces and an upwardly opening groove formed near the periphery of said top surface adapted to receive an edge of the sleeve therein;

a latch slideway formed in said pallet inboard of said groove but of such length that a portion thereof crosses said groove;

said slideway having an entrance aperture which opens laterally of said slideway to said bottom surface;

an, elongate latch member insertable into said latch slideway via said opening and slidable, when in said slideway, between a first position in which said member does not extend across said groove and a second position in which said member does extend across said groove; and means associated with said entrance for frictionally engaging and holding said member in each of said first and second positions but allowing movement between said positions upon application of manual force;

said frictional holding means comprising means defining a peripheral edge portion of said entrance having first and second wide portions corresponding to said first and second positions and a narrow portion between said first and second wide portions, and a detent formed on said latch member and extending into said entrance when said latch member is inserted into said slideway, said detent member being of such dimension as to pass between said wide portions only with the application of manual force.

11. Apparatus as defined in claim 10 wherein said molded plastic pallet comprises first and second sheets which are joined together to form an integral unit, said slideway being formed between and defined by said first and second sheets.

12. A container according to claim 3 wherein:

(I) said base member includes a plurality of upwardly opening U-shaped groove portions around the periphery of said base member over said tunnels and each including a bottom section defining a respective upwardly facing seat portion and upwardly extending inboard and outboard side wall sections; and (J) said line of action of said latch members intersects the inboard and outboard wall sections of said U-shaped groove portions.

13. A container comprising:
(A) a generally planar horizontally extending base member having downwardly opening tunnels extending across the lower face thereof for receipt of the forks of a forklift truck;
(B) a sleeve member adapted to be positioned on said base member with circumferentially spaced portions of its lower peripheral edge respectively positioned over said tunnels;
(C) a slot in at least certain of said lower peripheral edge portions of said sleeve member; and
(D) a plurality of latch members mounted on said base member at circumferentially spaced locations around said base member over said tunnels for sliding movement along a generally horizontal line of action between a latching position in which said latch members respectively pass through the slots in the lower peripheral edge portions of said sleeve for releasably securing said sleeve to said base member and a release position in which said latch members are slidably disengaged from said slots in said lower peripheral edge portions of said sleeve to allow said sleeve to be removed from said base member.

* * * * *